United States Patent
Kafle et al.

(10) Patent No.: US 9,628,377 B2
(45) Date of Patent: Apr. 18, 2017

(54) METHOD FOR LINK FAILURE DETECTION AND SESSION TRANSFER TO A LIVELY LINK IN THE MULTIHOMING ENVIRONMENT OF ID/LOCATOR SPLIT-BASED NETWORKS

(71) Applicant: NATIONAL INSTITUTE OF INFORMATION AND COMMUNICATIONS TECHNOLOGY, Koganei-shi, Tokyo (JP)

(72) Inventors: Ved Kafle, Koganei (JP); Hiroaki Harai, Koganei (JP)

(73) Assignee: National Institute of Information and Communications Technology, Tokyo (JP)

(*) Notice: Subject to any disclaimer, the term of this patent is extended or adjusted under 35 U.S.C. 154(b) by 0 days.

(21) Appl. No.: 14/770,822

(22) PCT Filed: Feb. 27, 2013

(86) PCT No.: PCT/JP2013/001155
§ 371 (c)(1),
(2) Date: Aug. 27, 2015

(87) PCT Pub. No.: WO2014/132286
PCT Pub. Date: Sep. 4, 2014

(65) Prior Publication Data
US 2016/0014020 A1  Jan. 14, 2016

(51) Int. Cl.
*H04W 36/08* (2009.01)
*H04L 12/26* (2006.01)
(Continued)

(52) U.S. Cl.
CPC .......... *H04L 45/28* (2013.01); *H04W 24/04* (2013.01); *H04W 60/005* (2013.01);
(Continued)

(58) Field of Classification Search
USPC ........................................ 370/228
See application file for complete search history.

(56) References Cited

U.S. PATENT DOCUMENTS

2007/0250642 A1* 10/2007 Thubert ............ H04L 29/12915
  709/245
2010/0054135 A1* 3/2010 Rahman ............ H04L 29/12952
  370/242
(Continued)

FOREIGN PATENT DOCUMENTS

JP  2008-312191 A  12/2008
JP  2012-248966 A  12/2012

OTHER PUBLICATIONS

International Search Report of International application No. PCT/JP2013/001155 completed May 1, 2013 and mailed May 14, 2013 (1 page).
(Continued)

*Primary Examiner* — Edan Orgad
*Assistant Examiner* — Sithu Ko
(74) *Attorney, Agent, or Firm* — Pyprus Pte Ltd

(57) ABSTRACT

This invention specifies mechanisms for detection of failure of links directly attached to communication devices (hosts and gateways) or lying in the path between these devices. The invention also specifies mechanisms for recovering communication sessions when the failure occurs. The failure in a link connected to the host or to the gateway is detected by using a link layer trigger by the respective node while the gateway failure or failure in a remote link is detected by a signaling mechanism initiated by the host on the basis of two control timers, probe timer and keepalive timer. The edge router and gateway also assist the host to detect the failure and quickly start the recovery process. They perform packet redirection through a lively link to the host, thus reducing or completely avoiding packet losses while the host performs the recovery mechanism to transfer the session from the failed link to the lively link.

2 Claims, 13 Drawing Sheets

(51) Int. Cl.
*H04L 12/703* (2013.01)
*H04W 24/04* (2009.01)
*H04W 76/02* (2009.01)
*H04W 60/00* (2009.01)
*H04W 88/06* (2009.01)

(52) U.S. Cl.
CPC ....... *H04W 76/025* (2013.01); *H04W 76/028* (2013.01); *H04W 88/06* (2013.01)

(56) References Cited

U.S. PATENT DOCUMENTS

2010/0260123 A1* 10/2010 Sugimoto ......... H04L 29/12952 370/329
2012/0201224 A1* 8/2012 Wu ......................... H04W 8/00 370/331

OTHER PUBLICATIONS

H. Jiang et al., Research on the Multihoming Scheme in a Loc/ID split context, Wireless Communications, Networking and Information Security (WCNIS), 2010 IEEE International Conference on, Jun. 27, 2010, pp. 522-527.

J. Pan et al., MILSA: A Mobility and Multihoming Supporting Identifier Locator Split Architecture for Naming in the Next Generation Internet, Global Telecommunications Conference, 2008. IEEE Globecom 2008, IEEE, Dec. 4, 2008, pp. 1-6.

J. Saltzer, On the Naming and Binding of Network Destinations, Aug. 1993.

D. Meyer et al, Report from the IAB Workshop on Routing and Addressing, Sep. 2007.

E. Nordmark et al, Shim6: Level 3 Multihoming Shim Protocol for IPv6, Jun. 2009.

D. Farinacci et al, Locator/ID Separation Protocol (LISP)draft-ietf-lisp-23, May 4, 2012.

Kafle et al, HIMALIS: Heterogeneity inclusion and mobility adaptation through locator ID separation in new generation network, Mar. 2010.

* cited by examiner

Notations-
DNR: Domain Name Registry
HNR: Host Name Registry
HGW: HIMALIS Gateway
GLoc: Global Locator Notations-
HGW: HIMALIS Gateway
Net.: Network
PHY: Physical (b) ID header format with basic header and optional header Notations-
HGW: HIMALIS Gateway
GLoc: Global Locator
LLoc: Local Locator Notations- → Data packets
--→ Signal packet ①: Link failure event
②: Peer host registration message
③: Locator update message
④: Application data
⑤: HNR record update message HNR: Host Name Registry
HGW: HIMALIS Gateway
GLoc: Global Locator
LLoc: Local Locator Notations- → Data packets
--→ Signal packet
HGW: HIMALIS Gateway
GLoc: Global Locator
LLoc: Local Locator ①: Link failure notification
②: Peer host registration message
③: Locator update message
④: Application data

Fig. 8B

The following state machines are also available in 'NORMAL KEEP ALIVE MANAGEMENT'

② State machine for sending Keepalive response packet

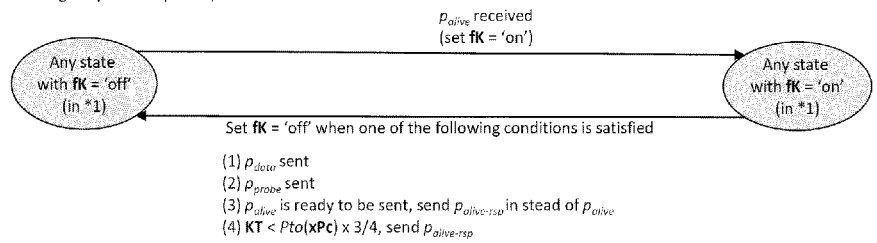

Set fK = 'off' when one of the following conditions is satisfied (1) $p_{data}$ sent
(2) $p_{probe}$ sent
(3) $p_{alive}$ is ready to be sent, send $p_{alive-rsp}$ in stead of $p_{alive}$
(4) KT < $Pto(xPc)$ × 3/4, send $p_{alive-rsp}$ ③ State machine for sending Probe response packet

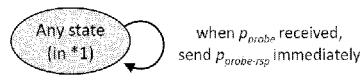

when $p_{probe}$ received, send $p_{probe-rsp}$ immediately

④ State machine for closing session due to no data transmission

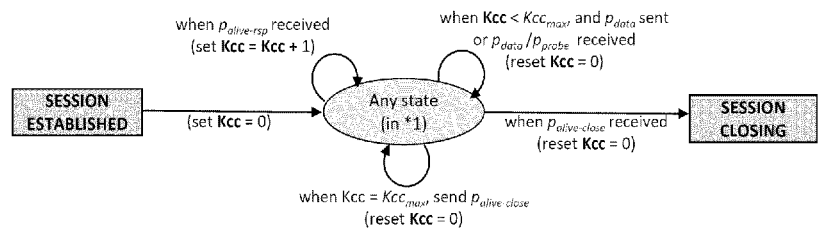

Notations-
ER: Edge Router
HGW: HIMALIS Gateway
GLoc: Global Locator
LLoc: Local Locator

METHOD FOR LINK FAILURE DETECTION AND SESSION TRANSFER TO A LIVELY LINK IN THE MULTIHOMING ENVIRONMENT OF ID/LOCATOR SPLIT-BASED NETWORKS

TECHNICAL FIELD

The invention relates to a failure detection and recovery method in a network and thus the invention is in the technical field of information and communication technology.

BACKGROUND

To enhance communication services with fault-tolerance, load-balancing, higher bandwidth, and cost-effective connectivity, multihoming configuration has been preferred in the networks. Two types of multihoming configurations are possible, host multihoming and site (or edge network) multihoming. In host multihoming, a host, i.e. an end-node, possesses two or more interfaces, each having connected with an access link. The host can use any of the links for a communication for the purpose of load-balancing and cost-effectiveness. Similarly, in site multihoming, a site or edge network is connected to one or more upper-level transit networks through two or more upstream links. Traffic from/to the multihomed site can pass through any upstream link for the purpose of resiliency, load-balancing, and increasing bandwidth.

The approaches to both host and site multihoming in the Internet have some limitations. Host multihoming cannot support fault-tolerance because the host cannot preserve an ongoing session from being disconnected when the link being used by the session goes down (or gets disconnected or fails). This problem is due to the reason that the IP address associated with the link has been used in two roles: as a session identifier (i.e., socket identifier) in the application and transport layers and as a locator in the network layer for locating the host and forwarding packets toward it (Non Patent Literature 1). When the host changes the link currently being used for the session to another link due to a trouble in the former link, both the session ID and locator become invalid at the same time and the session gets disconnected. Similarly, site multihoming has contributed negatively to the scaling of the Internet by increasing the routing table size of default-free zone (DFZ) BGP routers as it makes the routers to store multiple routes for the same site (Non Patent Literature 2). To overcome these limitations of host and site multihoming, some solutions based the ID/locator split concepts have been proposed recently (Non Patent Literatures 3, 4 and 5).

ID/locator split-based solutions use distinct numbers for IDs and locators, where IDs are topologically-independent values and locators are topologically-dependent values. IDs are used in the application and transport layers to identify sockets, sessions or end hosts, while locators are used in the network layer to locate hosts in the network topology and forward packets in the routing system. The locator is associated with a link and would change when the host switches its links or changes the link's attachment point in the network.

In related literature, Shim6 (Non Patent Literature 3) allows a multihomed host to use one of the IP addresses as the upper-layer ID (ULID) in the application and transport layers, which remains unchanged even if the locator used for routing in the network layer changes. The communication session is preserved even when the host switches its links (or locators) due to a trouble in the currently used link. A shim layer inserted above the IP routing sublayer hides the locator change by dynamically mapping the fixed ULID to various locators when a trouble in the link occurs. Similarly, although Locator/ID Separation Protocol (LISP) (Non Patent Literature 4) uses the concept of ID/locator separation, it is not stating about the failure detection and recovery in multihoming. It rather focuses on reducing the default-free zone (DFZ) routing table's size and update frequency. While Shim6 and LISP focus on addressing the issues of multihoming and routing scalability, HIMALIS (Non Patent Literature 5) presents a common architectural framework for better support of multihoming and mobility in heterogeneous networks that can use different network layer protocols in edge networks.

While the previous patents (Patent Literature 2) specified the mobility mechanisms of the ID/locator split-based network, this invention specifies a fault-detection and recovery mechanism to detect a link failure and transfer the communication session to another lively link in the multihoming environment of the network. The mechanism can be implemented in user devices, called hosts, alone, in both hosts and gateways, or in hosts, gateways and edge routers together. That is, the mechanism enables the host, gateway, and edge router to detect a failure in the link directly connected to them using a link-layer trigger. The gateway or the edge router assists the host by providing information about a link failure in their surroundings so that the host can promptly reroute packets through other available links in such a way that the session would get as little disturbance as possible. To detect the failure of a link that is not directly connected to the hosts, gateways and edge routers, or the failure caused by a problem in gateways or network congestion, this invention specifies a mechanism based on continuously monitoring of packet sending and receiving instances in the host by using two timers (probe timer and keepalive timer). In case packets are not sent or received within a specified timeout, the mechanism starts a probe process to locate the failure, searches for alternate lively paths, and transfers the session to the best lively path.

JP 2008-312191 A, which claims a priority based on JP Application Serial No. 2007-131030, describes the method to form node names or hostnames and IDs, the protocol stack of ID/locator split network architecture, the ID/locator split-based communication initialization process, and ID/locator split supporting hierarchical network structure.

CITATION LIST

Patent Literature

[Patent Literature 1] JP 2008-312191 A
[Patent Literature 2] JP2012-248966 A

Non Patent Literature

[NPL 1] J. Saltzer, "On the naming and binding of network destinations", RFC 1498, August 1993.
[NPL 2] D. Meyer, L. Zhang, and K. Fall, "Report from the IAB workshop on routing and addressing," RFC 4984, September 2007.
[NPL 3] E. Nordmark and M. Bagnulo, "Shim6: Level 3 multihoming shim protocol for IPv6," RFC 5533, June 2009.

[NPL 4] D. Farinacci, V. Fuller, D. Meyer, and D. Lewis, "Locator/ID separation protocol (LISP)," Internet-Draft, http://www.ietf.org/id/draft-ietf-lisp-23.txt, May 2012.

[NPL 5] V. P. Kafle and M. Inoue, "HIMALIS: Heterogeneity inclusion and mobility adaptation through locator ID separation in new generation network," IEICE Trans. Commun., vol. E93-B, no. 3, March 2010.

SUMMARY OF INVENTION

This invention specifies mechanisms for detection of failure of links directly attached to communication devices (hosts and gateways) or lying in the path between these devices. The invention also specifies mechanisms for recovering communication sessions when the failure occurs.

Technical Problem

Shim6 protocol specifies the multihoming support protocol to use one of the available IPv6 addresses as upper layer ID, which remains unchanged even when the IP address used in the network layer changes due to a failure. However, it does not specify how a link failure is detected.

Further, the protocol is valid only for IPv6 networks, not for IPv4 networks. Although LISP is based on ID/locator split concept, it does not specify about promptly detecting a link failure and transferring session to another link. It rather focuses on reducing the default-free zone (DFZ) routing table size and update frequency of BGP route. Similarly, HIMALIS network technologies patented so far also lacks the method for detecting a link failure and recovering the session by transferring it to another lively link.

Thus it is one object of the invention to provide a method for detecting and recovering from such a failure.

Solution to Problem

The above problem is solved by the claimed invention.

The first aspect of the invention relates to "Host's Link Failure Detection and Recovery". The invention comprises a failure detection and recovery method for a network. In the network, both user devices, hosts, and network devices, gateways, are connected to the network through multiple interfaces or links. The hosts are connected to different gateways through different links. The first host, Host A, is communicating through HGW1, one of Host A's gateways, with a second host, Host B, a peer Host. Host B is communicating through HGW4, one of Host B's gateways, with Host A. Host A and Host B also have one or more other gateways, for example, HGW2 and HGW3, respectively. HGW2 and HGW3 are not yet used for the communication between Host A and Host B but would be used if a failure of Host A's (or Host B's) link connected to HGW1 (or HGW4) is detected or a failure of HGW1's (or HWG4's) upstream link connecting HGW1 (or HGW4) to Edge Routers is detected or a failure HGW1 or HGW4 is detected.

HGWs are connected to a global network. That is, HGWs communicate through the global network.

Host A detects a failure of its link through which it was communicating with Host B. It is possible to detect such a link failure based on the conventional technology. For example, if Host A cannot send or receive data to/from Host B through that link, then Host A can understand that there is link failure in the currently connected link to the network. For example, when Host A is connected with Host A's gateway, HGW1 through the first link, Host A detects link failure and realizes that the first link has trouble. Host A is connected to the network not only through the link with failure, the first link, but also through at least another link. Host A may be connected with a plurality of links.

Host A selects another lively link of Host A. Host A's another gateway, HGW2, is connected with Host A through the lively link, the second link. The lively link of Host A is called the second link.

Then Host A selects its Global Locator (GLoc), GLoc2, which belongs to the lively link, the second link, as its new GLoc. A global locator (GLoc) represents the location of a host in the network topology and the network forwards packets from one edge network to another by using the destination GLoc present in the packet header as a label in the transit network routing infrastructure.

Host A registers ID and GLoc4 of Host A's peer host, Host B, in the Host A's other gateway, HGW2. HGW2 is a gateway connected with the second link or belongs to the new lively link of Host A. To register ID and GLoc, which is called as ID-to-GLoc mapping, Host A sends a registration message containing Host B's ID-to-GLoc4 mapping to HGW2. HGW2 stores Host B's ID-to-GLoc4 mapping in an ID Table. HGW2 has a memory or memories and thus HGW2 can store such information in the table.

Host A sends a locator update message, containing Host A's ID-to-GLoc2 mapping, to Host B. Host B updates its ID table with Host A's ID-to-GLoc2 mapping. Here, Host A's ID-to-GLoc2 mapping includes information of the ID and the current GLoc of Host A, GLoc2.

Host B sends a peer host registration message, containing Host A's ID-to-GLoc2 mapping, to Host B's gateway, HGW4. Then HGW4 updates its ID table with Host A's new GLoc, GLoc2.

Host A sends an HNR record update message to the Host Name Registry (HNR), which has stored Host A's ID-to-GLoc mapping. In Host A's ID-to-GLoc mapping record, HNR replaces GLoc1, which belongs to the link failure, with GLoc2, which belongs to the lively link.

One example of the first aspect of the invention is: a failure detection and recovery method for a network where both user devices, hosts, and network devices, gateways, are connected to the network through multiple interfaces or links, wherein the hosts are connected to different gateways through different links, wherein a first host, Host A, is communicating through HGW1, one of Host A's gateways, with a second host, Host B, wherein Host B is communicating through HGW4, one of Host B's gateways, with Host A, wherein Host A and Host B also have other gateways, HGW2 and HGW3, respectively, which are not yet used for the communication between Host A and Host B but would be used if a failure of Host A's (or Host B's) link connected to HGW1 (or HGW4) is detected or a failure of HGW1's (or HWG4's) upstream link connecting HGW1 (or HGW4) to Edge Routers is detected or a failure HGW1 or HGW4 is detected, the method comprising steps of:

detecting link failure by Host A;

selecting another lively link of Host A and gateway connected through the lively link, HGW2, by Host A;

selecting Global Locator (GLoc) belonging to the lively link as its new GLoc, GLoc2, by Host A;

registering ID and GLoc, ID-to-GLoc4 mapping, of Host B in HGW2, by sending a peer host registration message from Host A, and the ID-to-GLoc4 mapping of Host B being stored in Table of HGW2;

updating Host B with Host A's ID-to-GLoc2 mapping belonging to the lively link by sending a locator update message from Host A;

updating HGW4 connected to Host B with Host A's ID-to-GLoc2 mapping by sending a peer host registration message from Host B; and updating HNR records by sending an HNR record update message from Host A to replace GLoc1 belonging to the link failure with GLoc2 belonging to the lively link in Host A's ID-to-GLoc mapping stored in the HNR record.

The preferred embodiment of the first aspect relates to "HGW's Upstream Link Failure Detection and Recovery". It further comprises detecting upstream link failure by HGW1, HGW of Host A; and sending a GLoc unreachable message from HGW1 to Host A. Namely, HGW1 detects upstream link failure. There is Edge Router (ER) in the global network and the upstream link connects HGW1 with ER. When HGW1 finds the upstream link failure, it sends a GLoc unreachable message to Host A.

The preferred embodiment of the first aspect further comprises steps of:

detecting upstream link failure by HGW1; and sending a GLoc unreachable message from HGW1 to Host A.

The second aspect of the invention relates to "HGWs or Path between HGWs Failure Detection and Recovery".

Host A and Host B detect failure in HGW1, HGW4, or the path between HGW1 and HGW4 by continuously monitoring packet sending and receiving instances in Host A and Host B, through maintaining two timers: probe timer and keepalive timer. The probe timer is started and the keepalive timer is stopped after Host A sends a packet to Host B. The keepalive timer is started and the probe timer is stopped after Host A receives a packet. If the keepalive timer hits a specified keepalive timeout value, a packet is sent and if probe timer hits a specified probe timeout value, a series of probe packets are sent, each in the interval of half of the previous probe timeout value. If Host A does not receive any response to the probe packets sent from Host A, Host A starts failure detection and session recovery by the following steps.

Host A sends a first peer host registration message which contains ID-to-GLoc4 mapping, which is one ID to GLoc mapping of Host B, to HGW2. HGW2 is the second HGW of Host A. GLoc4 is Host B's GLoc, which is currently used as the destination GLoc by Host A to communicate with Host B.

Host A sends a second peer host registration message which contains ID-to-GLoc3 mapping, which is the other ID-to-GLoc mapping of Host B, to HGW1. HGW1 is the first HGW of the Host A. GLoc3 is a GLoc of Host B but has not been yet used as the destination GLoc by Host A for communication with Host B.

Host A determines that HGW1 is down when a peer host registration response is received only from HGW2.

Host A determines that HGW4 or the path leading from HGW1 to HGW4 has a trouble when Host A receives a peer host registration response from both HGW1 and HGW2.

One example of the second aspect of the invention comprises steps of:

detecting failure in HGW1, HGW4, or a path between HGW1 and HGW4 by having functions for continuously monitoring packet sending and receiving instances in Host A and Host B by using two timers, probe timer and keepalive timer; wherein the probe timer is started and the keepalive timer is stopped after sending a packet and keepalive timer is started and probe timer is stopped after receiving packet; if the keepalive timer hits a specified keepalive timeout value, a series of keepalive packets are sent at the interval of half of the previous keepalive timeout value, and if the probe timer hits a specified probe timeout value, a series of probe packets are sent, each in the interval of half of the previous probe timeout value; and if Host A does not receive any response to the probe packets sent from Host A, Host A starts failure detection and session recovery by:

sending a first peer host registration message containing ID-to-GLoc4 mapping, which is the currently used ID to GLoc mapping of Host B to HGW2;

sending a second peer host registration message containing ID-to-GLoc3 mapping, which is the other ID-to-GLoc mapping of Host B, to HGW1;

determining by Host A, HGW1 is down when a peer host registration response is received only from HGW2 determining by Host A, HGW4 or the path leading from HGW1 to HGW4 has a trouble when Host A receives a peer host registration response from both HGW1 and HGW2.

Advantageous Effects of Invention

The HIMALIS network architecture provides a generic framework for supporting both host and edge network multihoming. This invention specifies failure detection and session recovery mechanisms when the failure occurs in a link of the host or of a gateway connecting the edge network to the transit network. The failure in a link connected to the host or to the gateway is detected by using a link layer trigger by the respective node while the gateway failure or failure in a remote link is detected by a signaling mechanism initiated by the host on the basis of two control timers, probe timer and keepalive timer. The edge router and gateway also assist the host to detect the failure and quickly start the recovery process. They perform packet redirection through a lively link to the host, thus reducing or completely avoiding packet losses while the host performs the recovery mechanism to transfer the session from the failed link to the lively link.

BRIEF DESCRIPTION OF DRAWINGS

FIG. 8B depicts State machine diagram of failure detection mechanism. PT and KT keep decrementing when they are running and stop when their value reaches zero.

DESCRIPTION OF EMBODIMENTS

Architectural Components for Multihoming

Figure 1:
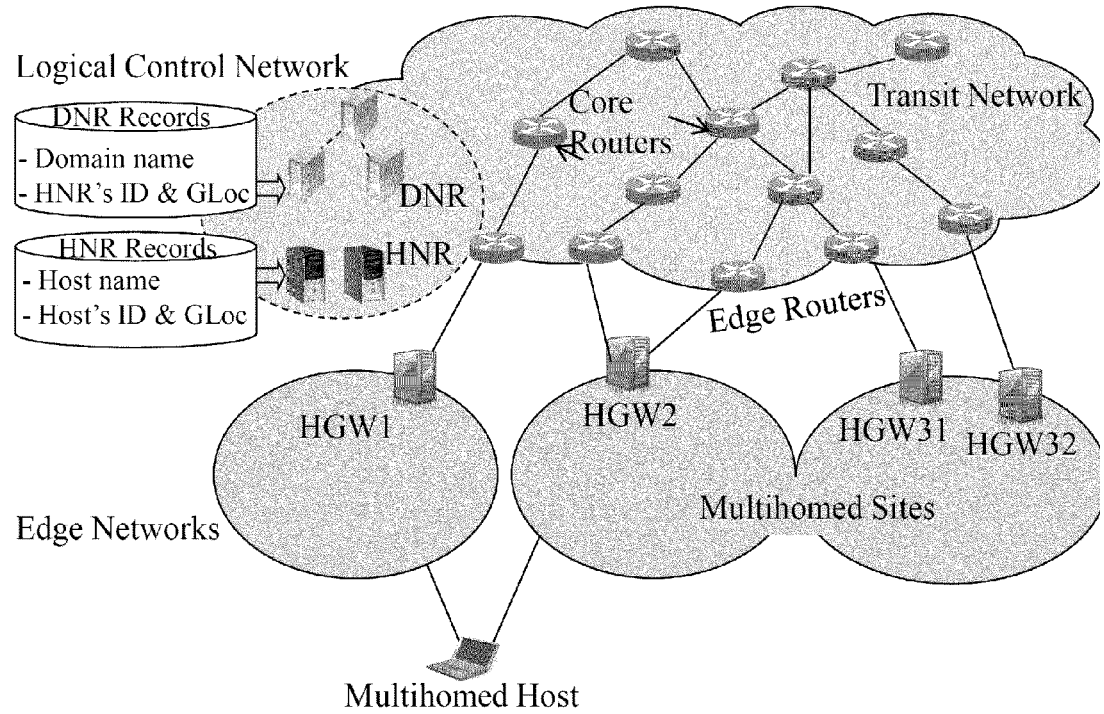
FIG. 1 depicts HIMALIS network components.

FIG. 1 shows the network components of the HIMALIS architecture, consisting of the edge networks, global transit network, and logical control network. The HIMALIS is one example of the architectures and the claimed invention is not limited to be used only for the HIMALS architecture.

The global transit network, which comprises high speed core and edge routers, inter-connects the edge networks. It uses a global locator (GLoc) space in the global network layer protocol to represent the location of a host in the network topology and forward packets from one edge network to another by using the destination GLoc present in the packet header as a label in the transit network routing infrastructure.

The edge network consists of the following entities: HIMALIS gateway (HGW) and hosts. The edge network may also contain other components for security enforcement. The edge network uses a local locator (LLoc) space in the local network layer protocol, which may be different from the transit network's GLoc space. For example, IPv6 addresses can be used for GLocs in the transit network and an IPv4 address block for LLocs in the edge network. Moreover, two different edge networks can use different local network protocols and LLoc spaces. Hosts located in edge networks that use different network protocols can communicate with each other via the HGWs. For example, a host located in an IPv4 network can communicate with another host located in an IPv6 network. The HGW connecting the edge network to the edge router in the transit network performs locator translation in the packet header. The host can be multihomed when it is connected to two edge networks simultaneously or getting two or more LLocs and GLocs from a single interface. It can also be a mobile device, which may move freely from one edge network to another while continuing application sessions.

The logical control network contains the hostname resolution system, comprising the domain name registry (DNR) and the host name registry (HNR), to store and provide the mappings between hostnames and IDs, locators and other parameters (such as security keys) (V. P. Kafle, R. Li, D. Inoue, and H. Harai, "An integrated security scheme for ID/locator split architecture of future network," Proc. FutureNet Workshop (held with IEEE ICC'12), June 2012). The DNR stores the mappings between domain names (e.g., id1domain1.com) and the HNR's IDs (e.g., 6e69-6274-6964-6c33-3-0-0-3) and locators (e.g., 10.10.1.2), while the HNR stores the mappings between hostnames (e.g., hosta#id1domain1.com) and host's IDs (e.g., 6e69-6274-6964-6c11-1-0-0-1) and locators (e.g., 2001:db8:1:200::2). The DNR records are mostly static because HNRs are not mobile and they retain both their IDs and locators for long time. The HNR records, on the other hand, are dynamic as they need to be updated when hosts change their locators, e.g., due to a link failure or mobility. The DNRs are organized in a hierarchical structure similar to the DNS for faster and scalable retrieval of static records about HNRs, while the HNRs have a flat structure to facilitate faster update of dynamic records about hosts.

The DNR and HNR have their roles in the hostname resolution, which takes place when a host starts a communication with a target host. In case the target host is multihomed, multiple GLocs corresponding to the target hostname would be obtained by the querying host from the records stored in the HNR. When a link failure occurs, the GLoc associated with the link becomes unreachable or unavailable. In this case, the target host gets the GLoc deleted from the HNR record by sending a HNR record update request. Thus, the HNR record update may occur at the end of the multihoming failure detection and session transfer mechanism as described in the following sections.

Figure 2:
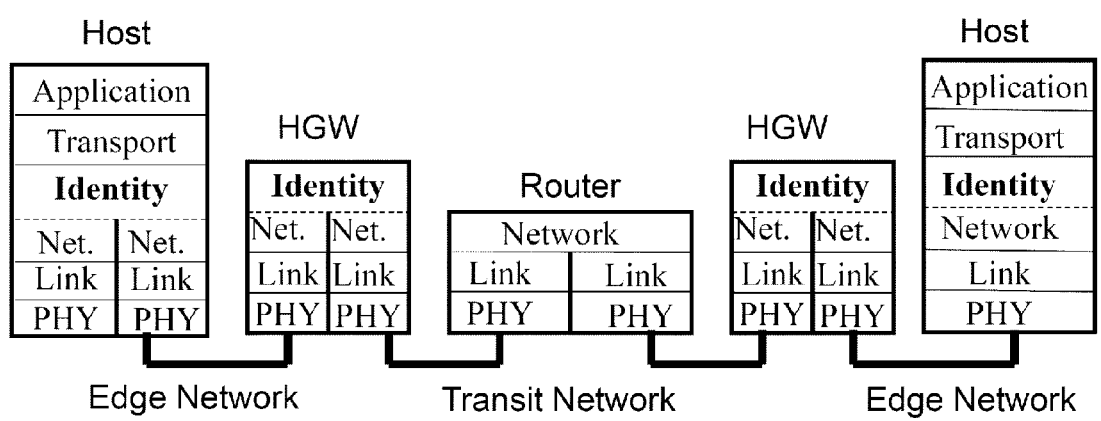
FIG. 2 depicts Protocol stack of HIMALIS network.

The protocol stack of HIMALIS network architecture is shown in FIG. 2. The stack in the host and HGW includes the newly introduced identity (ID) layer over the network layer. The identity layer in hosts performs the following functions: obtains source and destination IDs and locators from the ID table, configures the identity header, provides the locators to the network layer, and carries out multihoming signaling. Similarly in HGWs, the identity layer performs the following functions for forwarding a packet: obtains both the source's and destination's ID to locator mappings from the ID table, provides the locators to the network layer to create a new network header in the packet traversing the HGW. Thus the ID layer in the HGW helps the network layer to translate the network header in packets by providing the ID to locator mappings. The transit network has no identity layer and it routes packets from the network layer by using destination locators present in the packet header, as in the conventional Internet routing infrastructure.

Figure 3:
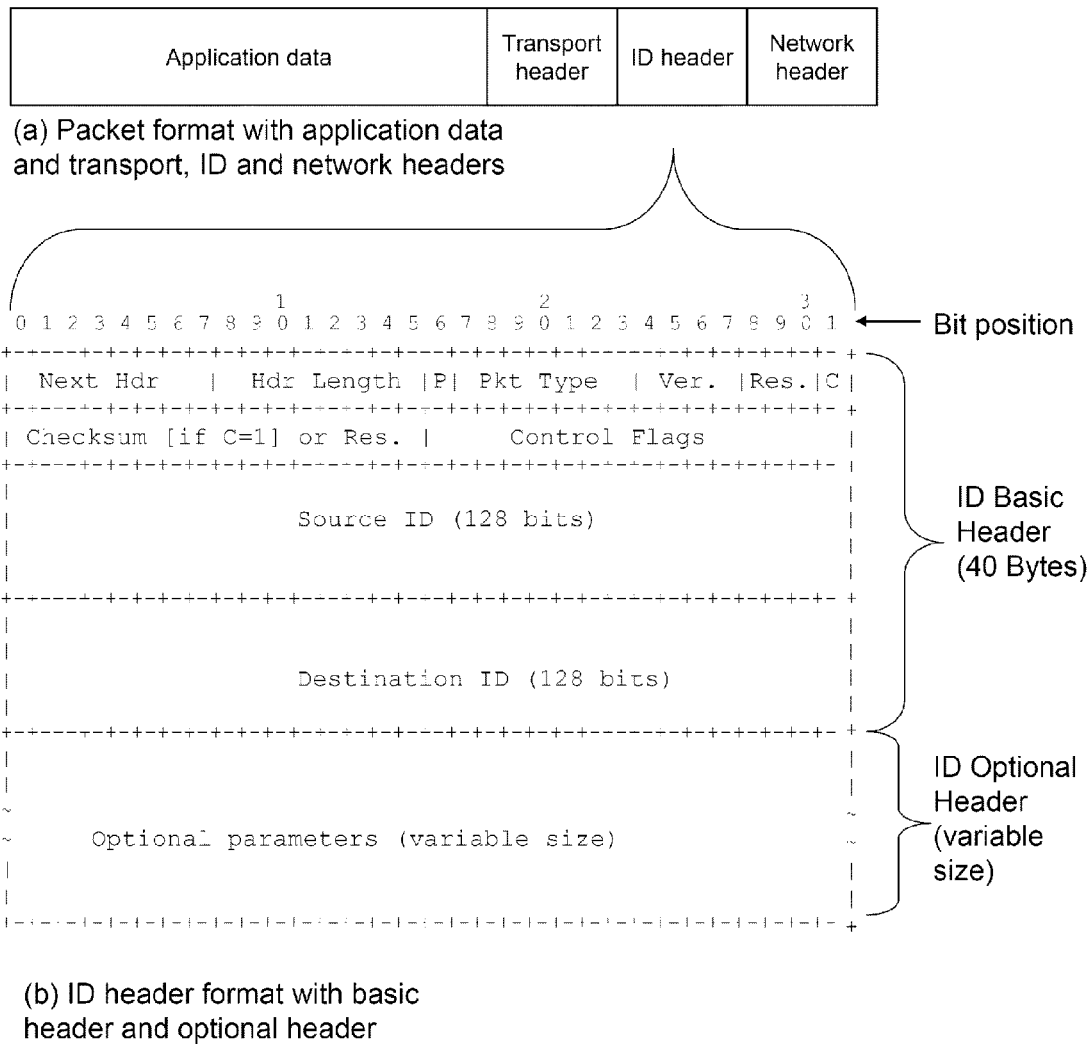
FIG. 3 depicts Packet format and ID header format.

FIG. 3 shows the packet format which includes application data and transport, ID and network headers. (The packet also includes a link-layer header, but it is not shown here because it not used in the explanation of the invented failure detection and recovery mechanism.) Among these headers, the ID and network headers are important in terms of multihoming support. The ID header contains IDs (among other parameters) and the network header contains locators. The ID header contains IDs of the data source and destination hosts, while the network header contains locators of intermediate nodes such as HGWs. Since the IDs present in ID header do not change while the packet traverse the network, the IDs are used as reference values to change locators in the network header. This capability is utilized in the design of failure recovery in multihoming. The ID header also contains an optional part, which can be used to carry information about locator update for recovering from a link failure.

Host Multihoming

Figure 4:
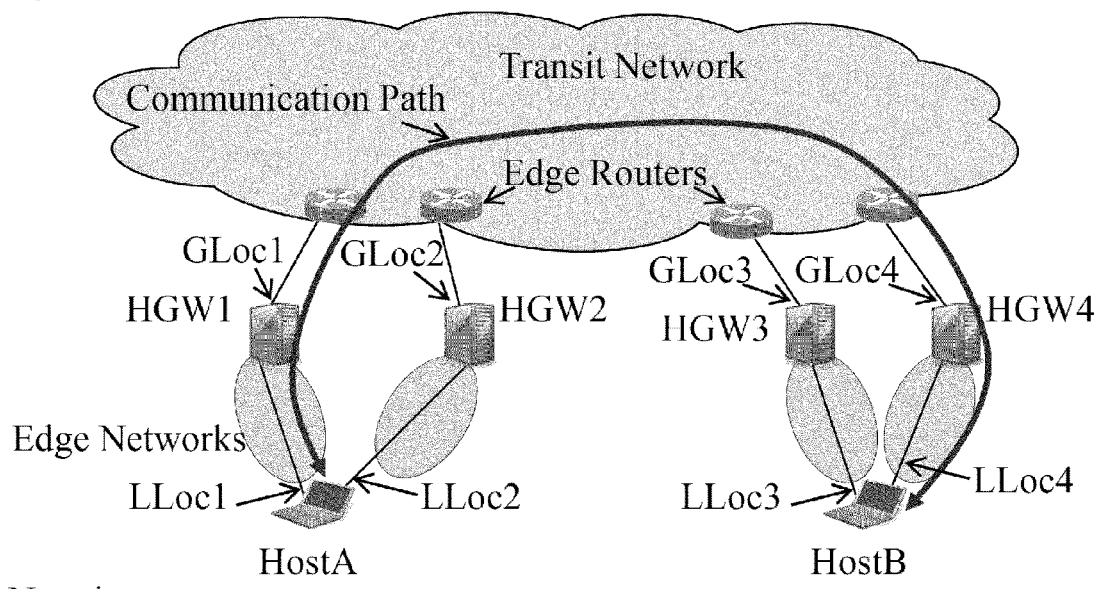
FIG. 4 depicts Host multihoming scenario.

FIG. 4 shows a host multihoming scenario where the hosts are multihomed with two different links. In this section, for simplicity in explanation, we assume that each edge network is single-homed, i.e., connected to the transit network through a single HGW having a single upstream link. The host is assigned with its LLocs and GLocs when it attaches with (or accesses) the edge network. During the network access, the HGW also stores in its ID table the ID, LLoc, and GLoc of the host located in its edge network. In the figure, each host has got two LLocs, which may belong to two different network layer protocols. For example, HostA's LLoc1 may be an IPv4 address (e.g., 10.10.1.2) and LLoc2 an IPv6 address (e.g., 2001:db8:1:200::2). Similarly, each host has two Glocs, which are actually the locators assigned from the transit network's GLoc space (which can be IPv4 or IPv6 global addresses) to the upstream interface of the HGWs. So, HostA has GLoc1 and GLoc2 and HostB has GLoc3 and GLoc4 as their global locators.

The host registers all GLocs with its HNR. In case any of these GLocs is changed, for example due to link failure, the host has to send an HNR record update message to update the HNR record with the new value of GLoc so that the HNR can always store and provide up-to-date ID/locator mapping records to other querying hosts.

In FIG. 4, when HostA wants to communicate with HostB, the former must know the latter's hostname (say hostb#idldomain2.com). HostA then resolves the HostB's hostname into HostB's ID and GLocs by sending name resolution queries to the DNR and HNR (DNR and HNR are not shown in the figure). Besides the ID and GLocs, HostA may retrieve security related information such as public key and certificate of HostB. HostA obtains HostB's ID and two GLocs (GLoc3 and GLoc4) through the name resolution. It selects an appropriate pair of its own and HostB's GLocs using a locator selection algorithm not specified in this invention. In FIG. 4, we have assumed that HostA's GLoc1 and HostB's GLoc4 have been selected for the communication. Before sending a packet to HostB, HostA has to register HostB's ID to GLocs mapping in the ID table of the HGW1, which is the default HGW for the GLoc1 selected by HostA as its GLoc for this communication session. This registration can be done either explicitly by sending a signaling message containing the peer host, i.e. HostB's ID and GLocs before dispatching the first packet for HostB, or implicitly by including the peer host ID and GLocs in the ID optional header of the first packet sent for HostB. Henceforth, we refer these registration choices as explicit peer host registration and implicit peer host registration, respectively. While registering HostB's ID to GLocs mapping, HostA assigns a preference value to each of HostB's GLocs so that the GLocs can be sorted in the HGW1's ID table in the order of the preferences. Here, HostA assigns a higher preference to GLoc4 than to GLoc3. In the explicit registration, the HGW1 adds HostB's ID-to-GLoc mapping to the ID table and replies to HostA with a response. In the implicit registration, the HGW1 adds HostB's ID-to-GLoc mapping to the ID table and uses it to translate the network header of the packet before forwarding the packet to the transit network.

Figure 5:
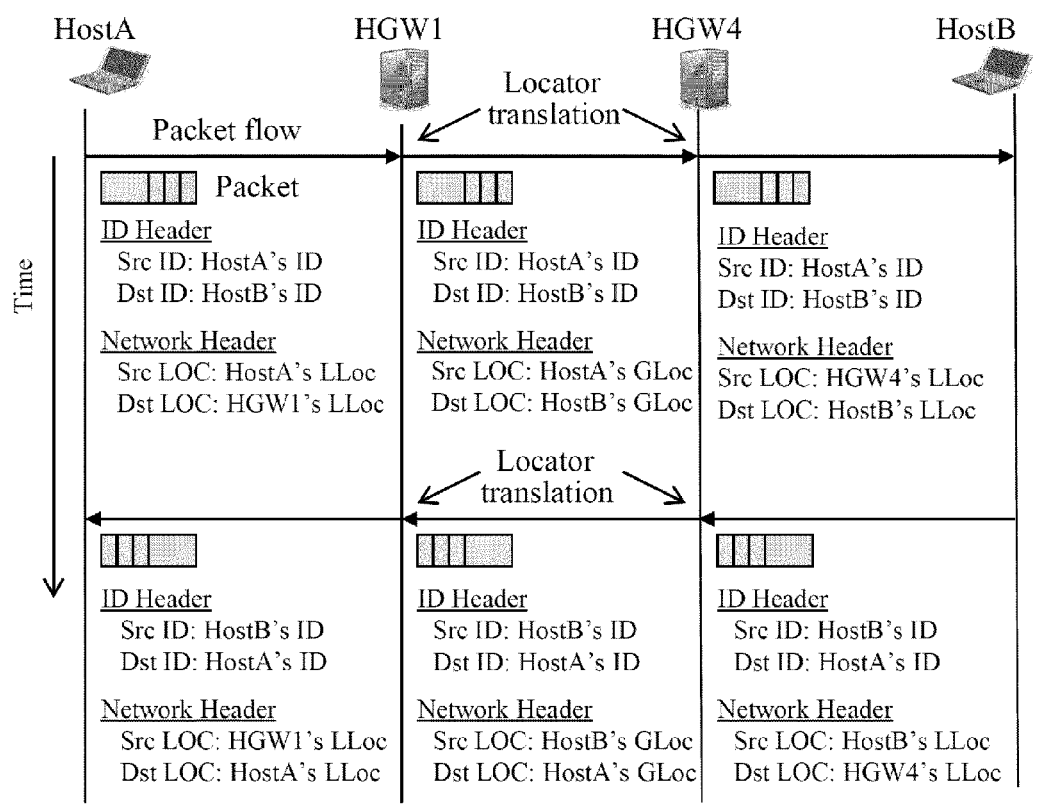
FIG. 5 depicts Packet flow showing how locators change in the network header as the packet passes through HGWs

FIG. 5 shows the IDs and locators in packet headers when the packet flows in different segments of the network. To send a packet to HostB, HostA uses its LLoc1 as the source locator and HGW1's LLoc as the destination locator in the network layer header and HostA's ID and HostB's ID as the source and destination IDs in the identity layer header. Note that LLocs, not Glocs, are used in network layer header of packets because the GLocs would not be routable (or recognized by the routing system) in the edge network. HostA also includes all of its GLocs (each with a preference value) in the first packet (known as communication initialization packet) sent to HostB. When the packet arrives, HGW1 reads the source and destination IDs from the packet header and then searches its ID table to find the destination ID to GLoc mapping. By using the destination ID-to-locator mapping with highest preference obtained form the ID table, HostA translates the source and destination LLocs to Glocs, i.e., it would use GLoc1 and GLoc4 as the source and destination locators in the network layer header of the packet and forward the packet over the transit network. The packet is routed in the transit network based on its destination locator value, i.e. GLoc4. As the packet reaches HGW4, it searches the ID table to find the destination ID to LLoc mapping. It then translates GLoc1 and GLoc4 of the network header into its own LLoc and HostB's LLoc4 (obtained from the ID table), respectively, and forwards the packet towards HostB.

HostB knows about HostA's ID-to-GLocs mapping (sorted in the order of preference) from the first packet received from HostA. HostB registers HostA's ID-to-GLoc mapping in HGW4's ID table by explicit or implicit peer host registration. HostB uses its LLoc1 as the source locator and HGW4's LLoc as the destination locator in the network layer header and HostB's ID and HostA's ID as the source and destination IDs in the identity layer header. When the packet arrives, HGW4 reads the source and destination IDs from the packet header and then searches its ID table to find the destination ID-to-GLoc mapping. By using the destination ID-to-locator mapping obtained form the ID table, HGW4 translates the source and destination LLocs to Glocs, i.e., it would use GLoc4 and GLoc1 as the source and destination locators in the network layer header of the packet and forward the packet over the transit network. The packet is routed in the transit network based on its destination locator value, i.e. GLoc1. As the packet reaches HGW1, it searches the ID table to find the destination ID-to-LLoc mapping. It then translates GLoc4 and GLoc1 into its own LLoc and HostA's LLoc1 (obtained from the ID table), respectively, and forwards the packet towards HostA. In this way, the subsequent packets exchanged between these two hosts undergo LLoc to GLoc translation, or vice versa, in HGWs.

The communication session would be disturbed when one of the hosts' or HGWs' links lying in the communication path goes down and, subsequently, the GLoc or LLoc assigned for the link becomes unreachable. In this case, the multihomed host has to carry out inter-link session transfer or handover from the troubled link to another lively link within a short time in order to prevent the session from being disconnected. Depending on the link that does down, the host performs session handover after detecting the link failure, either by itself or with the help of the HGWs and edge routers as described in the following subsections.

Host's Link Failure

When the host's link is down, the host would be unreachable from its HGW as well as from the peer host. For example, if HostA's link used by the session is down in FIG. 4, LLoc1 would be unreachable from HGW1, and, consequently, HostA would be unreachable at GLoc1 from HostB. In this case, in order to reduce the impact of the link failure on the session, the following functions are performed to transfer the session from the failed link to the other lively link as soon as possible (shown in FIG. 6): (1) detect link failure, (2) select another lively link and register the peer hosts' ID to GLoc mapping in the new HGW (i.e., HGW2), (3) update HostB with the new preference order of HostA's GLocs, (4) get data packets via HGW2, and (5) update HNR records by deleting the GLoc associated with the failed link. By performing these functions in a short time, the host can prevent the session from being disconnected.

(1) The host can easily detect if the link directly connected to its interface is up or down by using a link-layer trigger.

Figure 6:
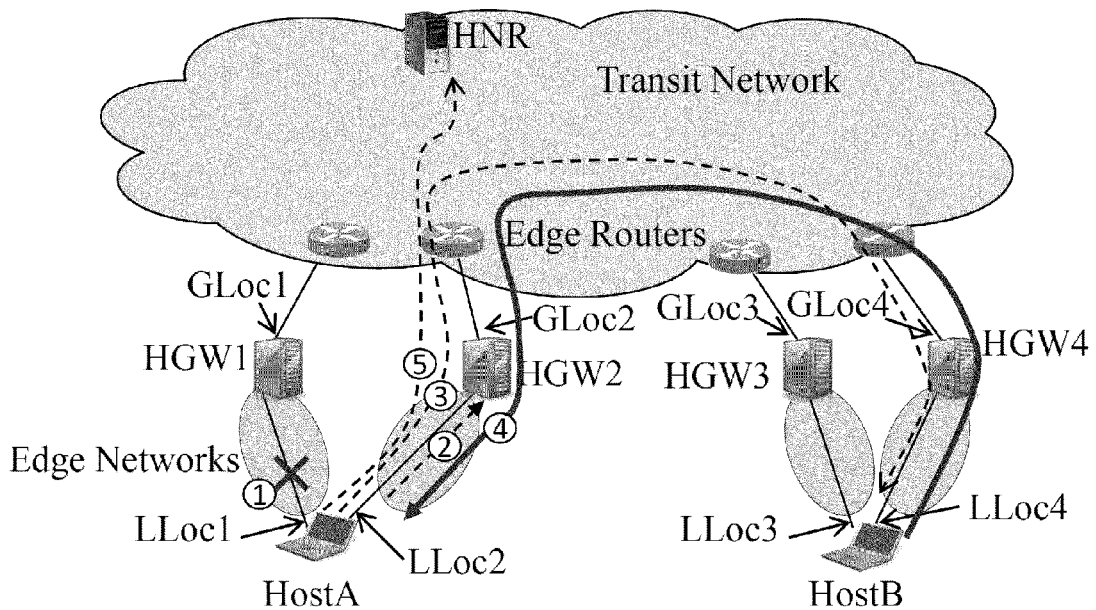
FIG. 6 depicts Host link failure detection and session transfer to the other link.

(2) After the link failure detection, among the other available links (if it has many), the host has to first select an appropriate link for the session (by using a locator selected algorithm such as one specified in RFC 3484 [8] or in [9]). In FIG. 6, since HostA has only two links, it would select the other available link, which has LLoc2 as local locator and is connected to HGW2. To start using LLoc2 and GLoc2 as the local and global locators, respectively, for the session, HostA registers HostB's ID-to-GLocs (GLoc3 and GLoc4; GLoc4 with higher preference) mapping to HGW2 by performing explicit or implicit peer host registration. HGW2 adds HostB's ID-to-GLocs mapping to its ID table.

(3) HostA then updates HostB with the new preference order of HostA's GLocs (i.e., GLoc2 in higher preference and GLoc1 in lower or zero preference) by sending an explicit locator update signaling message, or, alternatively, by including the HostA's new ID-to-GLoc mapping preferences in the ID optional header of the packet. Henceforth, the locator update by sending an explicit signaling message is called explicit locator update and by implicitly including the ID-to-GLoc mapping preferences in the ID optional header of packet is called implicit locator update. HostB updates its ID table with HostA's ID-to-GLoc2 mapping preference change. It then updates HGW4's ID table by performing explicit or implicit peer host registration.

(4) Then, HGW4 uses the new mapping to forward packets destined for HostA's ID to GLoc2. The packet reaches to HGW2, which forwards the packet to HostA's LLoc2 by translating GLocs to LLocs in the network layer header by searching HostA's ID/LLoc2 mapping from the ID table.

(5) HostA sends an HNR record update request to its HNR to delete GLoc1 from the record. This function always takes place at the end of link failure detection and session transfer mechanism. However, for the reason of conciseness, we omit HNR record update signaling from the figures and texts of the following paragraphs.

HGW's Upstream Link Failure

When the HGW's upstream link (i.e. the link connected to the transit network) is down, the host would be unreachable at its GLoc from the peer host. However, the HGW would still remain reachable at its LLoc from the local host. For example, if HGW1's upstream link used by HostA's session is down in FIG. 4, GLoc1 would be unreachable, and, consequently, HostA would be unreachable at GLoc1 from HostB. However, HostA can be reached at LLoc1 from HGW1 or from other local hosts located in the same edge network.

Figure 7:
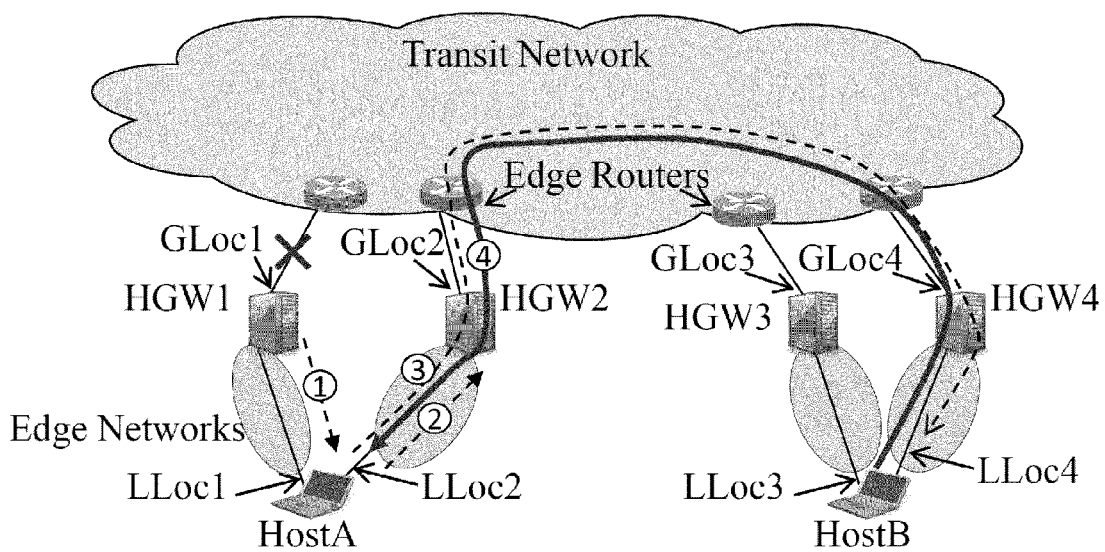
FIG. 7 depicts HGW's upstream link failure detection and session transfer.

In this case, unless HGW1 helps HostA to detect the GLoc unreachability, HostA may take a longer time to know it and by that time its session might have disconnected. Therefore, in order to avoid this problem, we have developed a HGW notification mechanism. In this mechanism, when HGW1 detects that its upstream link has been down, it configures a "GLoc unreachable notice" message containing GLoc1 as the unreachable GLoc and sends the message to HostA, as shown by arrow (1) in FIG. 7. On receiving this notice, HostA performs the session transfer from GLoc1 to GLoc2 by executing functions (2), (3) and (4) as described previously.

HGW Failure

When the HGW goes out of order, its both GLoc and LLoc become unreachable and the HGW would be unable to send any notice to the local host to inform the latter about the GLoc unreachability. In this case, the session may get disconnected if the host cannot detect the failure and recover from it in a short time. Therefore, we have developed a HGW failure detection and recovery mechanism as described below.

1) Failure Detection

Figure 8A:
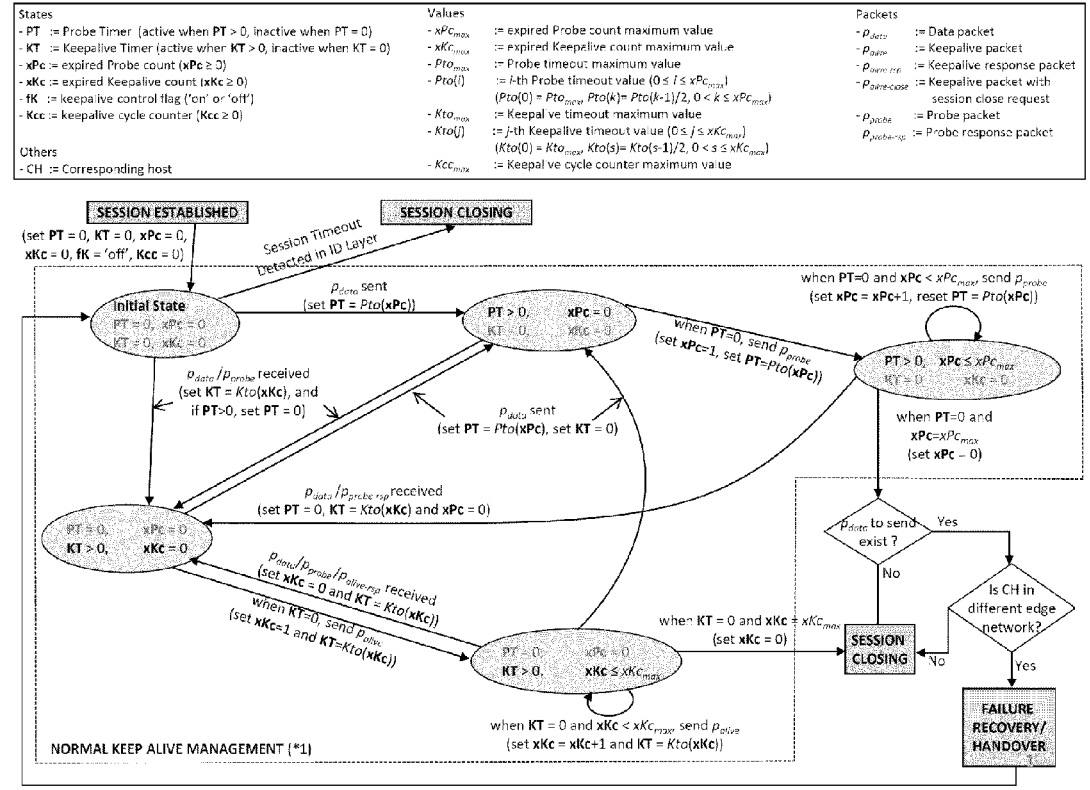
FIG. 8A depicts State machine diagram of failure detection mechanism. PT and KT keep decrementing when they are running and stop when their value reaches zero.

The HGW failure detection mechanism is based on monitoring of the packet receiving and sending events by maintaining two timers (keepalive timer and probe timer) in the identity layer of the host protocol stack. These two timers are mutually exclusive, that is, only one is running at a time. FIG. 8 shows the state-machine diagram of the operation of the failure detection. In the initial state, both timers are set off. When the host sends a packet it stops the keepalive timer (if it was running) and starts the probe timer. In case the probe timer was already started, it does not do any change in the timers. When the host receives a packet, it stops the probe timer (if it was running) and starts keepalive timer. In case the keepalive timer was already started, it does not do any change in the timers.

When the keepalive timer hits Keepalive Timeout seconds (whose value is negotiated during the communication initialization phase), the host sends a keepalive packet to the peer host and resets its keepalive timer to a reduced keepalive timeout value (which would be about ½ of the previous keepalive timeout). On receiving the keepalive packet, the peer host is supposed to respond the host immediately with a payload packet (if it has application data to send) or a keepalive packet (if it has no data to send or if it wants to close the ID layer session). If the host receives back a data packet or keepalive packet after sending the keepalive packet, it returns its keepalive timer to the normal Keepalive Timeout and wait until the timer expiration for sending another keepalive packet. If both hosts have no application data and are exchanging only keepalive packets, either may issue a special type of keepalive (i.e. keepalive-close) packet to close the failure detection mechanism. Then both timers will be stopped in both hosts. In case the host does not receive a response to its keepalive packet within the reduced keepalive timeout, it sends another keepalive packet and resets the keepalive timer to ½ of the previous keepalive timeout. In case the host does not receive any response again, it will repeatedly send keepalive packets and reduce the keepalive timeout value until the number of keepalive packets reaches "expired keepalive count maximum value". It then stops the keepalive timer and enters into the failure recovery phase as described later.

When the probe timer hits Probe Timeout seconds (whose value is negotiated during the communication initialization phase), the host sends a probe packet and resets its probe timer to a reduced probe timeout value (which would be about ½ of the previous probe timeout value). On receiving the probe packet, the peer host is supposed to respond the host immediately with a probe response packet. If the host receives back a probe response packet, it knows that the communication path is still active and stops the probe timer. It then resumes sending application data packets and starts the probe timer. However, in case the host does not receive a response for its probe packet within the probe timeout, it sends another probe packet and resets the probe timer to ½ of the previous probe timeout. In case the host does not receive any response again, it will repeatedly send probe packets and reduce the probe timeout until the number of probe packets reaches "expired probe count maximum value". If no response received from the peer host, it stops the probe timer and enters into the failure recovery phase as described below.

Failure Recovery

The failure recovery mechanism starts with a process to locate the troubled HGW in the currently used communication path. For simplicity in explanation, we assume that the failure recovery mechanism is initiated by HostA in FIG. 7. To check if the trouble was due to its local HGW, HostA sends an explicit peer host registration message containing HostB's ID-to-GLoc3 mapping with higher preference (that is, HostB's other GLoc that has not been yet used for the session) to HGW1, and another peer registration message containing HostB's ID-to-Gloc4 mapping with higher preference (that is, the GLoc currently used for the session) to HGW2. If there are three or more GLocs are available for each hosts, the host may apply a method (not specified here) to limit the number of candidate GLocs that could be used to communicate with the peer host. If these HGWs are alive, they would add HostB's ID-to-GLoc mappings to their ID tables and send a response back to HostA. The following two cases are possible.

Case I: If a peer host registration response is received only from HGW2 but not from HGW1-HostA assumes that its own HGW1 has been down and GLoc1 has become unreachable. It then sends an explicit or implicit locator update message containing ID-to-GLoc2 mapping with a higher preference value to HostB via HGW2. The remaining functions for the session transfer from HGW1 to HGW2 take place as specified by functions (3), (4) and (5) in the previous paragraphs.

Case II: If responses are received from both HGW1 and HGW2-HostA assumes that its own HGWs are fine and there might be a trouble with HostB's HGW4 and GLoc4. It then sends a probe packet containing the value of the possibly troubled GLoc4 to HostB via HGW1 and HGW3. On receiving this packet, HostB uploads the HostA's ID-to-Gloc mapping to HGW3 by doing a peer host registration and then sends a response to HostA via HGW3. After getting the response, HostA resumes the communication using GLoc3 as the destination GLoc.

In this way, the trouble in the local and remote HGWs is identified and the session is resumed through the lively HGWs. The failure detection and recovery scheme described above is also applicable for detecting disruption in communication sessions caused by congestion or path failure in the transit network.

Edge Network Multihoming

As mentioned earlier in paragraphs, edge or site multihoming can be done either by having a single HGW with multiple upstream links or having multiple HGWs (each with one or more upstream links) in an edge network. In the former case, the failure detection and session recovery procedure is carried out as specified for the host multihoming in the previous section. That is, when there is a failure in the HGW's one upstream link, it sends a "GLoc unreachable notice" to the host, which then sends a locator update message containing the other GLoc to the peer host. Therefore, in the below paragraphs we describe the failure detection and recovery mechanism associated with only the latter multihoming case, i.e., the edge network having multiple HGWs.

Edge Network Multihoming with Multiple HGWs

When the edge network is connected to the transit network through multiple HGWs, the host can be either logically multihomed through its single interface or physically multihomed through its two or more interfaces. The logically multihomed host can get multiple LLocs and GLocs (each associated with the different HGW) assigned to the same interface through a locator configuration protocol such as Dynamic Host Configuration Protocol (DHCP). Similarly, the physically multihomed host can get multiple LLocs (at least one for each interface) and GLocs (at least one from each HGW) using the locator configuration protocol. In case of logically multihomed hosts, all the LLocs and GLocs become unreachable when the host's link is down although the multiple HGWs of the edge network cooperate to each other to recover the session from the link failure. In contrast, in case of the physically multihomed host, only the LLoc associated with the failed link would be unreachable and its GLocs and LLocs associated with the other links would remain reachable or alive. Therefore, as a general case of edge network multihoming, we explain the failure detection and session recovery mechanism for only physically multihomed hosts below.

Figure 9:
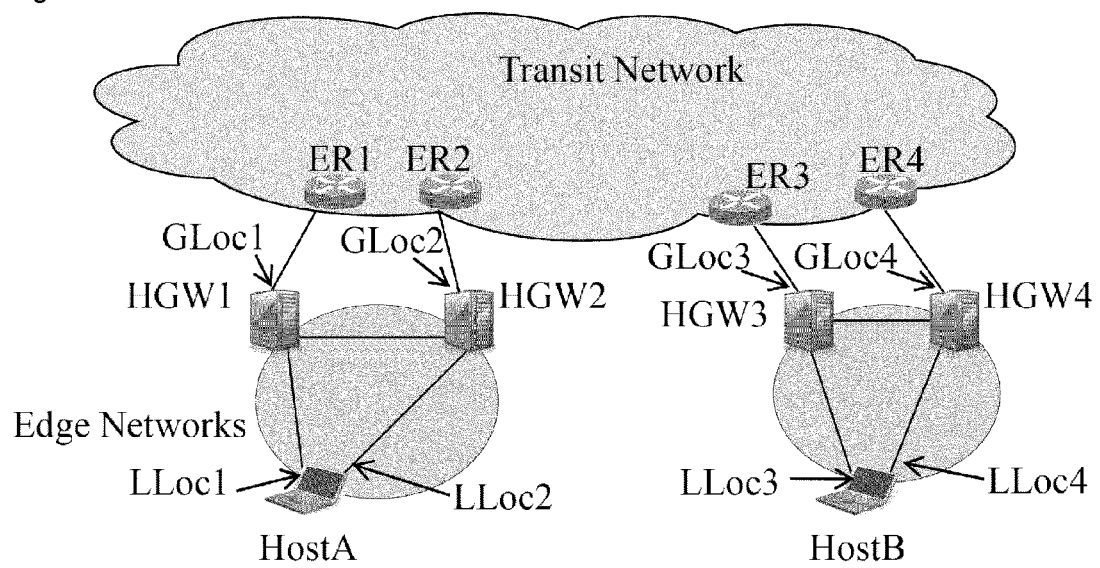
FIG. 9 depicts Edge network multihoming with multiple HGWs.

FIG. 9 shows the edge network multihoming scenario, where the hosts are connected through multiple links and the edge networks are also connected through multiple HGWs to the transit network. The multiple HGWs of the edge network cooperate with each other and with the hosts to detect a failure and recover from it. We consider the following link failure cases in this scenario: (i) failure of host's link, (ii) failure of HGW's upstream link, (iii) failure of HGW's downstream link, and (iv) failure of HGW itself. It is reminded that the HGW's downstream link failure was not explicitly considered in the explanation of host multihoming in the previous section because this case was equivalent to the HGW failure. In the following explanation, we assume that in FIG. 9 HostA is using left-hand side link and HGW1 to communicate with HostB via HGW4. The packet flow path of the communication is shown by the upper part of FIG. 10.

Figure 10:
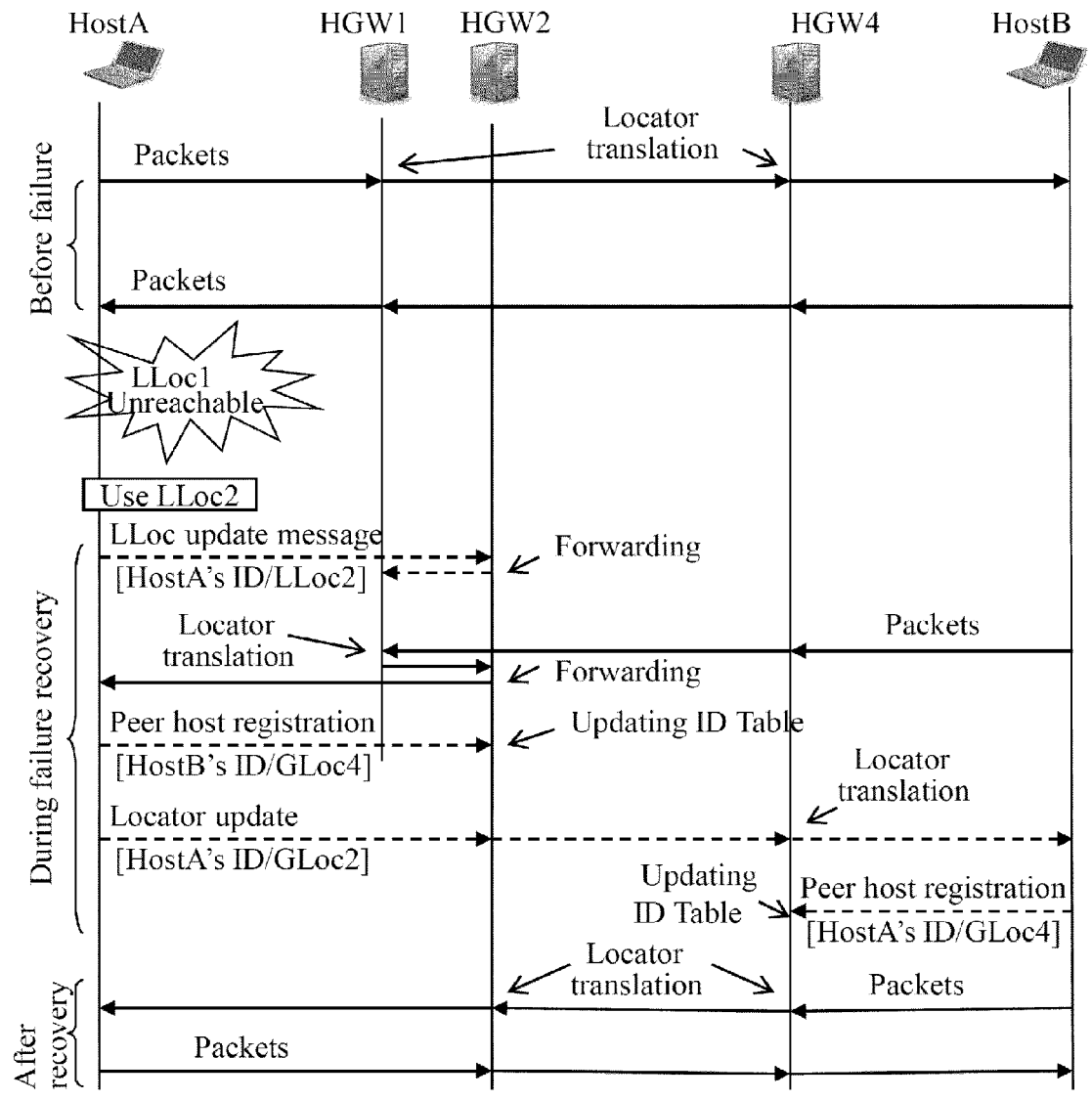
FIG. 10 depicts Recovery from a host link failure in the edge network having multiple HGWs.

(i) Failure of host's link: As described previously, the host uses its link layer trigger to detect the failure of its link. Suppose in FIG. 9 HostA's left hand side link is down and LLoc1 has become unreachable. In order to reduce the loss of packets sent from the disconnected HGW, the host uses its right hand side link and LLoc2 to send a LLoc update message containing its active ID/LLoc2 mapping to HGW1 through HGW2 (as shown in FIG. 10), as soon as it detects that its left hand side link is down. On receiving this request, HGW1 updates its ID table with LLoc2 as HostA's local locator so that it can forward the incoming packets to LLoc2. The outgoing packets from the host (not shown in the figure) follow the same path in the reverse direction up to HGW1, where these packets undergo locator translation and get forwarded to the transit network. At the mean time, the host changes its GLoc from GLoc1 to GLoc2 for the session, performs (explicit or implicit) peer host registration in HGW2, and locator update in HostB. After that the incoming packets from HostB would arrive directly at HGW2 (i.e., without coming through HGW1) and HGW2 would translate the network header by inserting LLoc2 in the destination locator field and forward these packets to HostA.

In an alternate approach, HGW1 may forward ID-to-GLoc4 mapping to HGW2 when it receives LLoc update message. HGW1 may inform about this transfer to HostB by sending a reply to the LLoc update message. On receiving this information, the host would not perform peer host registration in HGW2 and can directly send the locator update to HostB.

Figure 11:
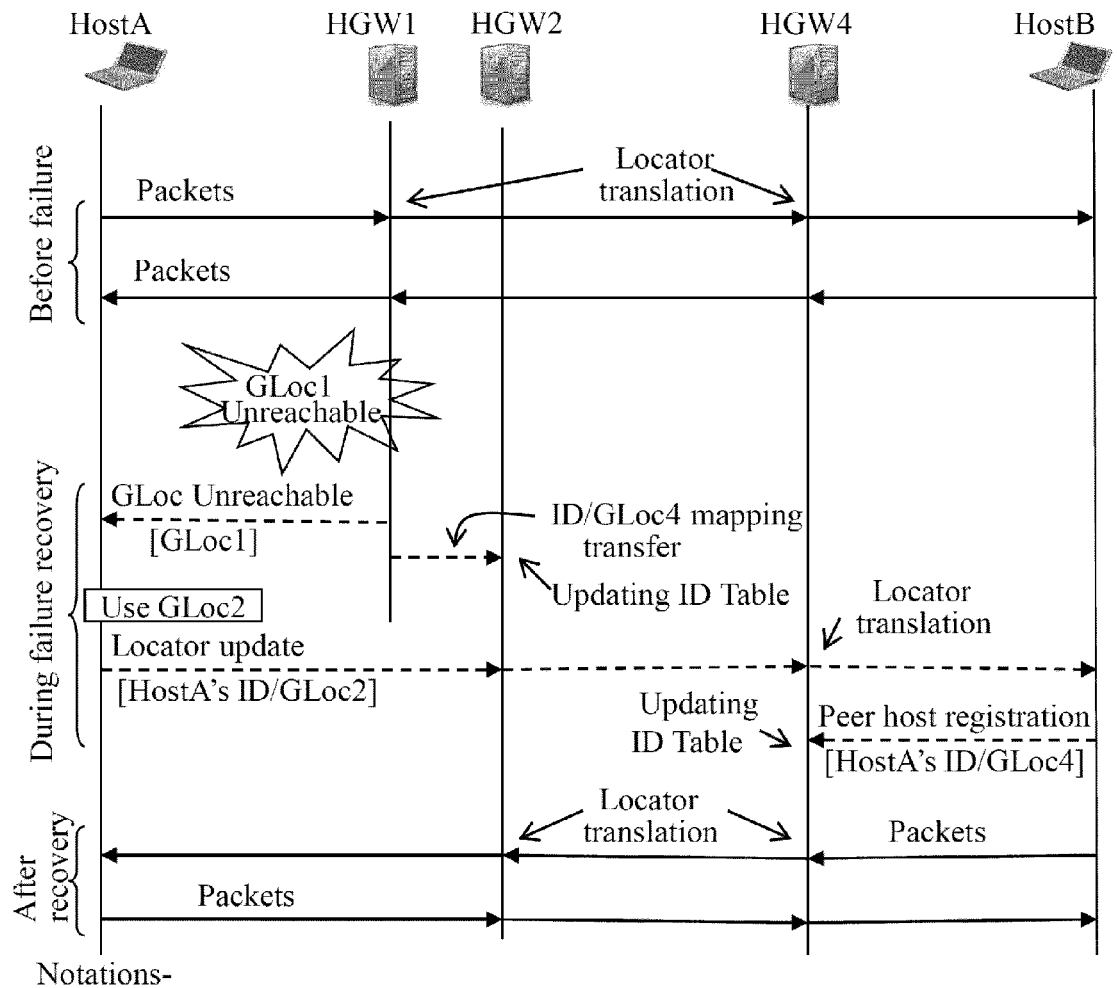
FIG. 11 depicts Recovery from HGW's upstream link failure.

(ii) Failure of HGW's upstream link: In this case the failed HGW, i.e., HGW1 informs the local host to use the other HGW by sending a GLoc unreachable notice (as shown in FIG. 11). HGW1 may transfer all the ID/GLoc mappings stored in its ID table to the other HGW if the link between the two HGWs is working. HGW1 would indicate about the transfer in the GLoc unreachable message sent to the host by setting a flag so that the host does not need to perform peer host registration in HGW2 (otherwise, HostA has to upload HostB's ID-to-GLoc mappings to HGW2 by performing explicit or implicit peer host registration.) The host can promptly send the peer host a locator update message containing GLoc2 with a higher preference value. The peer host would perform peer host registration with its HGW4 to update the ID table with GLoc2 so that HGW4 would use GLoc2 in the destination locator field of the outgoing packets. The packets would arrive at HGW2 and then get forwarded to HostA after having GLoc to LLoc translation in the network layer header. The outgoing packets from HostA follow the same path in the reverse direction. In this way, the session would get successfully transferred to HGW2 from HGW1 in the event of upstream link failure.

(iii) Failure of HGW's downstream link: This link failure scenario is somehow similar to the host link failure scenario discussed earlier. Only difference here is that the HGW knows the failure first and the host may not know it for some time. The host can send its packets through the path terminating at the failed link. So in order to reduce the packet loss, the HGW should inform the host about the failure as soon as possible. For this purpose, the HGW stores all LLocs of the local hosts; for some LLocs the HGW would be the default HGW, while for other LLocs it would not be. The HGW would use the host's other LLoc, for which it is not a default HGW, in the destination locator to send a locator unreachable message indicating about the HGW's LLoc unreachability and forward the massage through the other HGW. The message gets routed to the host by the routing system of the edge network. The host updates its ID table and stops using the troubled LLoc, i.e. LLoc1, as the source locator to forward packets to HGW1. It would instead use LLoc2 in the source locator and HGW1's LLoc as the destination locator for outgoing data packets. The incoming packets would follow the same path in the reverse direction. In this way, the session continues without changing the source and destination GLoc pairs used for it, and the peer host is kept transparent form the failure.

Alternatively, the host may perform peer host registration with HGW2 and locator update with the peer host to transfer the session completely from HGW1 to HGW2 in order to make the communication path shorter by avoiding packet forwarding through the link connecting these HGWs. However, this may increase the burden on HGW2 of ID/locator mapping while HGW1 would become completely idle. So, in order to share the load, it may be better to keep using HGW1 although the communication path is slightly longer. In this case, HGW2 would be simply working as a router without doing any ID layer processing for ID/locator mapping and network header translation.

(iv) Failure of HGW: When a HGW fails, both of its downstream and upstream links become unreachable. Consequently, the host's GLoc associated with the HGW becomes unreachable and packets from outside the edge network sent to this GLoc cannot reach the host. The failure can be detected either by the host by using the packet receiving and sending events monitoring method specified in the previous section or by a neighboring HGW of the multihomed edge network. The neighboring HGW can detect the failure sooner than the host by using a protocol such as Bidirectional Forwarding Detection [13] through the link connecting the two HGWs. On detecting the failure, the neighboring HGW would inform the host about the other HGW failure and GLoc unreachability to the host so that the host can perform the session transfer procedure by promptly. The host would perform peer host registration in the other lively HGW and locator update in the peer hosts and resume the communication through the lively HGW.

Edge Router-Supported Edge Network Multihoming

An edge router can help the edge network to promptly detect a failure of the link between itself and the HGW and avoid the downstream packets from getting dropped from the edge router. For this purpose, the edge router stores all GLocs (belonging to different HGWs) of the multihomed edge network so that it can redirect (by encapsulating) downstream packets to one of the remaining lively Glocs when the failure occurs. The edge router is provided with these GLocs by the HGW. That is, when the HGW connects to the edge router and obtains a GLoc from the global locator prefix provided by the edge router, the HGW also provides the edge router with information about its alternate GLocs that can be used to reach it. For example, in FIG. 9 HGW1 provides GLoc2 to ER1 as its alternate GLoc so that ER1 knows that HGW1 can also be reached at GLoc2, in addition to GLoc1.

Figure 12:
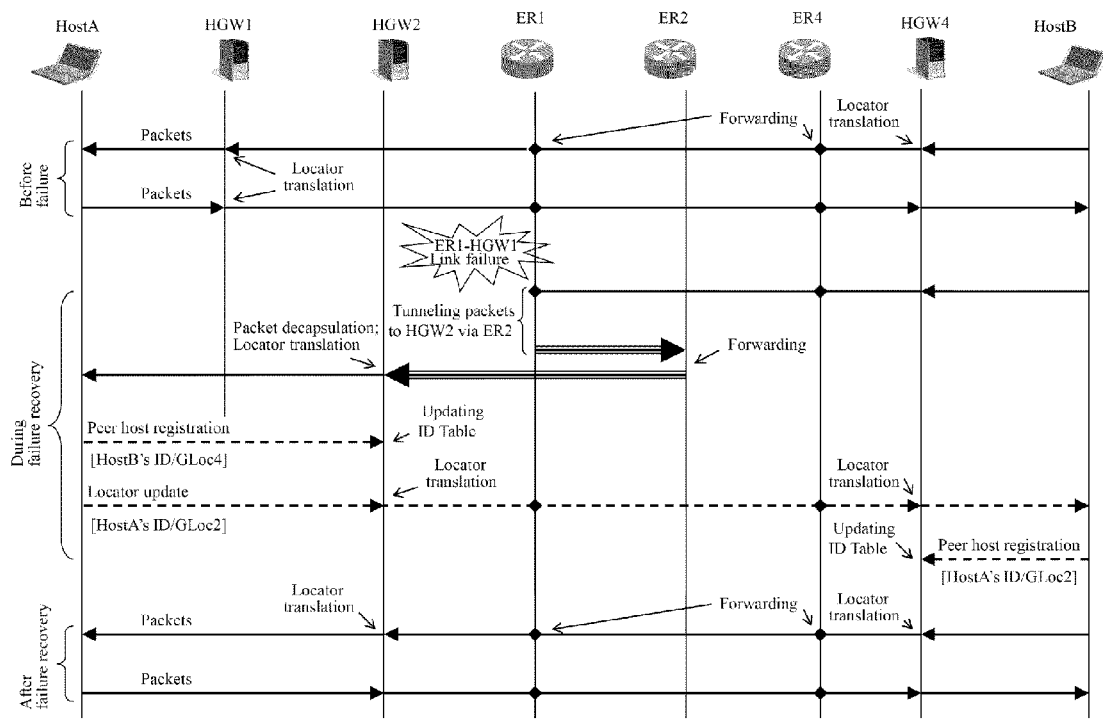
FIG. 12 depicts Edge router-supported failure recovery.

FIG. 12 shows the procedure for redirecting downstream packets when ER1 detects that the link between ER1 and HGW1 has been down. ER1 starts forwarding the downstream packets destined for GLoc1 to HGW2 via ER2 by encapsulating them by using a protocol, such as GRE [14], with GLoc1 and GLoc2 in the source and destination locator fields, respectively, in the encapsulating network header. On receiving these packets, HGW2 decapsulates them and translates the GLocs into LLocs in the packet header by using the ID/LLoc mappings stored in its ID table. It then forwards the packet to HostA at LLoc2. After receing this packet, HostA performs peer host registration in HGW2 to store HostB's ID/Gloc4 mapping in HGW2's ID table. HostA then performs locator update in HostB to update its GLoc from Gloc1 to Gloc2. Then HostB performs peer host registration with HGW4 to update the ID table with HostA's ID/GLoc2 mapping so that data packets destined for HostA's ID would be forwarded to GLoc2.

In this way, the session is smoothly transferred from GLoc1 to GLoc2.

INDUSTRIAL APPLICABILITY

The invention is applicable to mobile and heterogeneous networks where user devices can have two or more network interfaces connected to various networks (e.g., wired LAN, WiFi, cellular and WiMAX(Trademark)). The user can use any network that may use different network layer protocol such as OPv4 and IPv6 for its communication. The user thus can have a choice to select an optimal network. During the communication if there is a problem in the currently used link (e.g., due to disturbance in wireless connection or mobility), the device will quickly detect the link failure and transfer the communication session to another lively link. In this way, the user can ex-perience the best communication service all the time despite a link failure. For example, a user with a smart mobile phone or laptop computer can remain connected to the network even when he or she is having a problem in the currently used link. Hr or she can smoothly move from a wireless LAN (WiFi) network to a WiMAX network or a cellular network.

The invention claimed is:

1. Failure detection and recovery method for a network where both user devices, hosts, and network devices, gateways, are connected to the network through multiple interfaces or links, wherein the hosts are connected to different gateways through different links, wherein a first host, Host A, is communicating through HGW (HIMALIS (Heterogeneity inclusion and mobility adaptation through locator ID separation in new generation network) gateway) 1, one of Host A's gateways, with a second host, Host B, wherein Host B is communicating through HGW4, one of Host B's gateways, with Host A, wherein Host A and Host B also have other gateways, HGW2 and HGW3, respectively, which are not yet used for the communication between Host A and Host B but would be used if a failure of Host A's (or Host B's) link connected to HGW1 (or HGW4) is detected or a failure of HGW1's (or HWG4's) upstream link connecting HGW1 (or HGW4) to Edge Routers is detected or a failure HGW1 or HGW4 is detected, the method comprising steps of:

detecting link failure by Host A;
selecting another lively link of Host A and gateway connected through the lively link, HGW2, by Host A;

selecting Global Locator (GLoc) belonging to the lively link as its new GLoc, GLoc2, by Host A;

registering ID and GLoc, ID-to-GLoc4 mapping, of Host B in HGW2, by sending a peer host registration message from Host A, and the ID-to-GLoc4 mapping of Host B being stored in Table of HGW2;

updating Host B with Host A's ID-to-GLoc2 mapping belonging to the lively link by sending a locator update message from Host A;

updating HGW4 connected to Host B with Host A's ID-to-GLoc2 mapping by sending a peer host registration message from Host B; and updating HNR (host name registry) records by sending an HNR record update message from Host A to replace GLoc1 belonging to the link failure with GLoc2 belonging to the lively link in Host A's ID-to-GLoc mapping stored in the HNR record;

wherein the method further comprises steps of:

detecting upstream link failure by HGW1; and sending a GLoc unreachable message from HGW1 to Host A.

2. Failure detection and recovery method for a network in accordance with claim 1, the method further comprising steps of:

detecting failure in HGW1, HGW4, or a path between HGW1 and HGW4 by having functions for continuously monitoring packet sending and receiving instances in Host A and Host B by using two timers, probe timer and keepalive timer; wherein the probe timer is started and the keepalive timer is stopped after sending a packet and keepalive timer is started and probe timer is stopped after receiving packet; if the keepalive timer hits a specified keepalive timeout value, a series of keepalive packets are sent at the interval of half of the previous keepalive timeout value, and if the probe timer hits a specified probe timeout value, a series of probe packets are sent, each in the interval of half of the previous probe timeout value; and if Host A does not receive any response to the probe packets sent from Host A, Host A starts failure detection and session recovery by:

sending a first peer host registration message containing ID-to-GLoc4 mapping, which is the currently used ID to GLoc mapping of Host B to HGW2;

sending a second peer host registration message containing ID-to-GLoc3 mapping, which is the other ID-to-GLoc mapping of Host B, to HGW1;

determining by Host A, HGW1 is down when a peer host registration response is received only from HGW2; and determining by Host A, HGW4 or the path leading from HGW1 to HGW4 has a trouble when Host A receives a peer host registration response from both HGW1 and HGW2.

* * * * *